United States Patent
Ushiku

(10) Patent No.: US 8,275,992 B2
(45) Date of Patent: Sep. 25, 2012

(54) INFORMATION PROCESSING APPARATUS FOR RECEIVING BIOMETRIC INFORMATION FROM AN EXTERNAL APPARATUS

(75) Inventor: Toru Ushiku, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 12/465,979

(22) Filed: May 14, 2009

(65) Prior Publication Data

US 2010/0011424 A1 Jan. 14, 2010

(30) Foreign Application Priority Data

Jul. 14, 2008 (JP) ................................ 2008-183007

(51) Int. Cl.
*G06F 21/00* (2006.01)
(52) U.S. Cl. ........ 713/176; 713/186; 713/166; 713/168; 713/173; 726/2; 726/5
(58) Field of Classification Search ............... 726/2, 5; 713/176, 186, 166, 168, 173
See application file for complete search history.

(56) References Cited

U.S. PATENT DOCUMENTS

| | | | | |
|---|---|---|---|---|
| 6,052,468 A * | 4/2000 | Hillhouse | ...................... | 380/281 |
| 6,697,947 B1 * | 2/2004 | Matyas et al. | ................. | 713/182 |
| 7,137,008 B1 * | 11/2006 | Hamid et al. | ................. | 713/182 |
| 7,143,284 B2 * | 11/2006 | Wheeler et al. | ............... | 713/155 |
| 7,191,466 B1 * | 3/2007 | Hamid et al. | ..................... | 726/3 |
| 7,921,297 B2 * | 4/2011 | Ortiz et al. | ..................... | 713/182 |
| 7,937,590 B2 * | 5/2011 | Wuidart | ....................... | 713/186 |
| 7,941,669 B2 * | 5/2011 | Foley et al. | ................... | 713/182 |
| 8,019,131 B2 * | 9/2011 | Wong et al. | .................. | 382/124 |
| 8,074,889 B2 * | 12/2011 | Beenau et al. | ................ | 235/487 |

FOREIGN PATENT DOCUMENTS

JP 2005-204031 A 7/2005

* cited by examiner

*Primary Examiner* — Krisna Lim
(74) *Attorney, Agent, or Firm* — Canon USA Inc. IP Division

(57) ABSTRACT

An information processing apparatus not having an input device for receiving biometric information can access another information processing apparatus requiring the specific biometric information. A control method for controlling the information processing apparatus includes authenticating a user using biometric information, receiving an access request from an external apparatus, and requesting the external apparatus to send the biometric information in response to reception of the access request from the information processing apparatus. When the information processing apparatus does not have an inputting unit for inputting the requested biometric information, the requesting step includes requesting a predetermined substitute apparatus having the inputting unit to send the biometric information. The authenticating step includes authenticating the user based on the biometric information sent from the predetermined substitute apparatus in response to the request made at the requesting step.

10 Claims, 13 Drawing Sheets

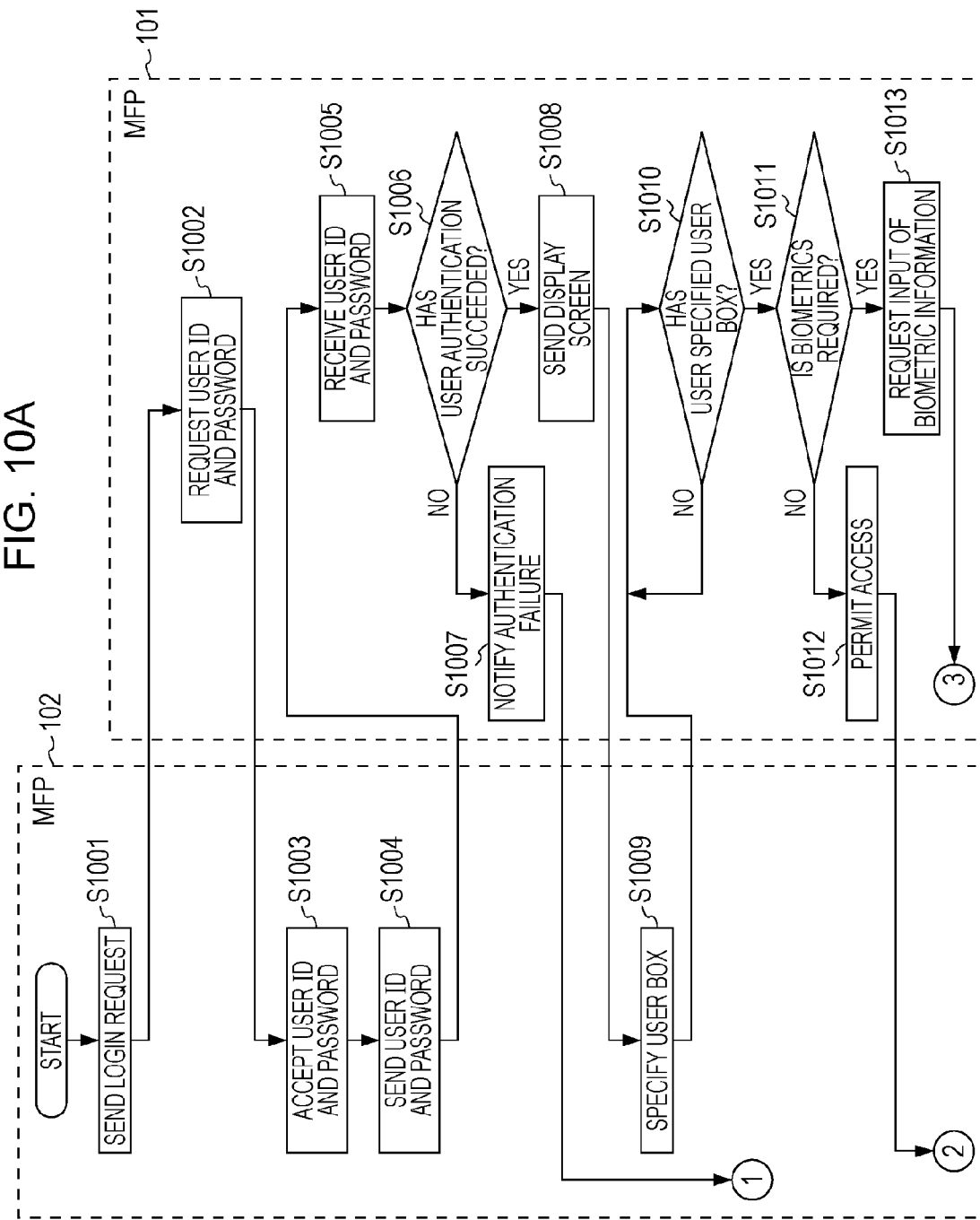

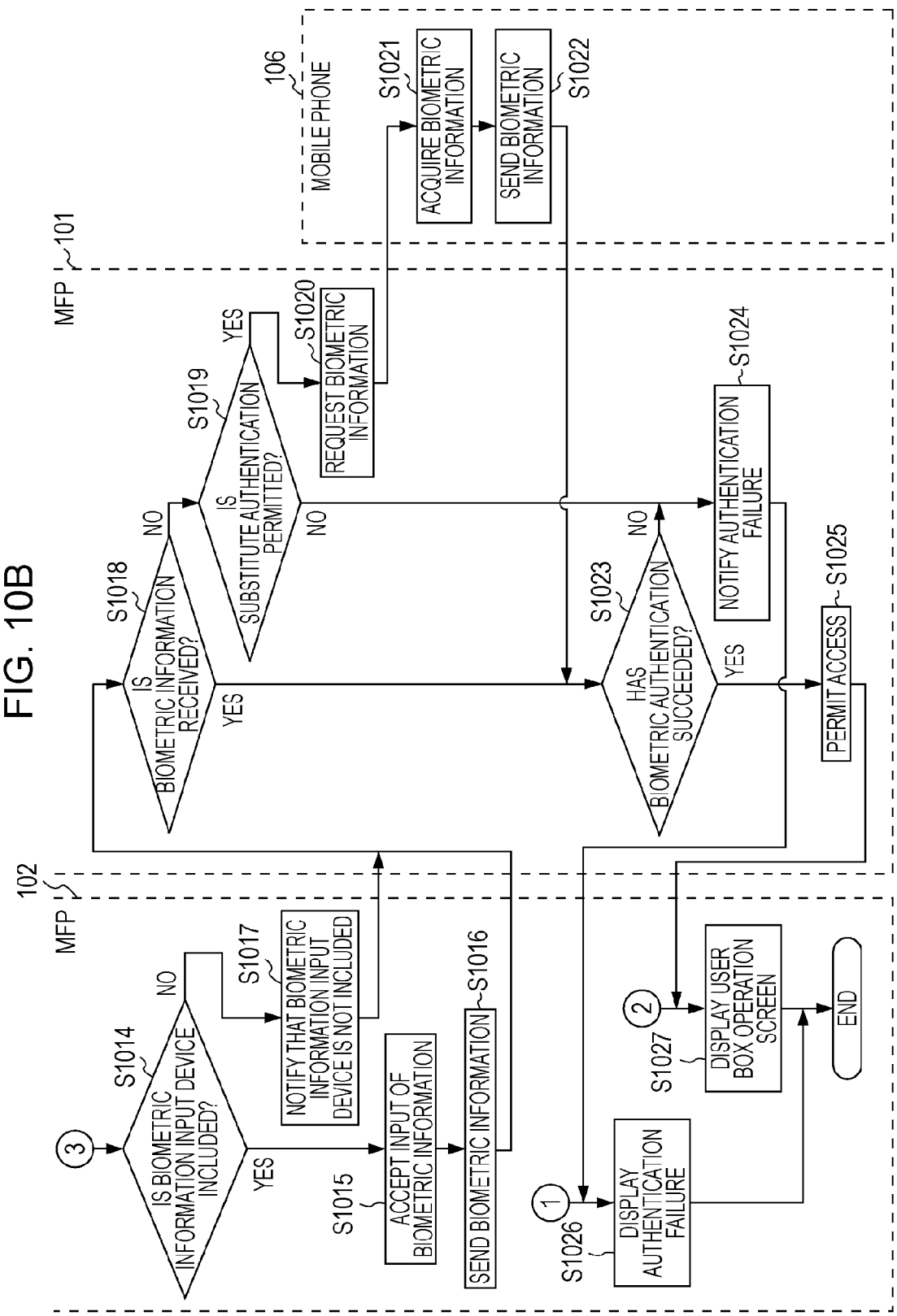

FIG. 14

STORAGE MEDIUM, SUCH AS FD/CD-ROM

| DIRECTORY INFORMATION |
|---|
| FIRST PROCESSING PROGRAM<br>PROGRAM CODES CORRESPONDING TO STEPS OF FLOWCHART SHOWN IN FIG. 7 |
| SECOND PROCESSING PROGRAM<br>PROGRAM CODES CORRESPONDING TO STEPS OF FLOWCHART SHOWN IN FIG. 10 |
| |

INFORMATION PROCESSING APPARATUS FOR RECEIVING BIOMETRIC INFORMATION FROM AN EXTERNAL APPARATUS

This application claims the benefit of Japanese Patent Application No. 2008-183007 filed on Jul. 14, 2008, which is hereby incorporated by reference herein in its entirety.

BACKGROUND OF THE INVENTION

1. Field of the Invention

The present invention relates to an information processing apparatus, a method for controlling the information processing apparatus, a recording medium, and a program.

2. Description of the Related Art

Information processing apparatuses for sharing data stored in a storage device with other information processing apparatuses via a network have been proposed (see Japanese Patent Laid-Open No. 2005-204031).

To increase the security level, some of such information processing apparatuses may request the other information processing apparatuses to send a password when being accessed by the other information processing apparatuses.

Information processing apparatuses having a biometric authentication function for performing authentication using a biometric authentication device have also been proposed.

However, an authentication function of each of a plurality of information processing apparatuses connected to a network may differ from one another.

For example, one information processing apparatus has a biometric authentication function, whereas another information processing apparatus does not have the biometric authentication function.

In such a case, the information processing apparatus having the biometric authentication function may include a biometric information input device for use in biometric authentication, whereas the information processing apparatus not having the biometric authentication function may not include the biometric information input device. When the authentication function differs among information processing apparatuses, following disadvantages occur. When an information processing apparatus accesses another information processing apparatus having a biometric authentication function, the information processing apparatus may be requested to send biometric information by the other information processing apparatus. In such a case, since the accessing information processing apparatus does not have an input device of the requested biometric information, the accessing information processing apparatus may not acquire the biometric information.

Accordingly, when the information processing apparatus having the biometric information input device is accessed by the other information processing apparatus not having the biometric authentication device, the information processing apparatus having the biometric information input device may permit the access without authentication. However, in such a case, the security level decreases.

On the other hand, if the information processing apparatus having the biometric information input device prohibits access from the information processing apparatus not having the biometric information input device without exception, the convenience decreases.

SUMMARY OF THE INVENTION

The present invention provides an information processing apparatus and a method for controlling the information processing apparatus which overcome the above-described problem.

An aspect of the present invention provides an information processing apparatus including an authenticating unit configured to authenticate a user using authentication information, a receiving unit configured to receive an access request from another apparatus, and a requesting unit configured to request the other apparatus to send the authentication information upon the receiving unit receiving the access request from the other apparatus. In a case where the other apparatus does not have an inputting unit for inputting the requested authentication information, the requesting unit requests a predetermined substitute apparatus having the inputting unit to send the authentication information. The authenticating unit authenticates the user based on the authentication information sent from the predetermined substitute apparatus in response to the request of the requesting unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principle of the invention.

FIG. 8 is a diagram showing an example of a user interface to be displayed in an MFP according to an exemplary embodiment of the present invention.

FIG. 9 is a diagram showing an example of a user interface to be displayed in an MFP according to an exemplary embodiment of the present invention.

FIGS. 10A and 10B are flowcharts showing an example of a first data processing procedure executed by an image processing system according to an exemplary embodiment of the present invention.

FIG. 14 is a diagram illustrating a memory map of a storage medium for storing various data processing programs that can be read by an image processing system according to an exemplary embodiment of the present invention.

DESCRIPTION OF THE EMBODIMENTS

Exemplary embodiments of the present invention will now be described with reference to the accompanying drawings.

Description of System Configuration

First Exemplary Embodiment

Figure 1:
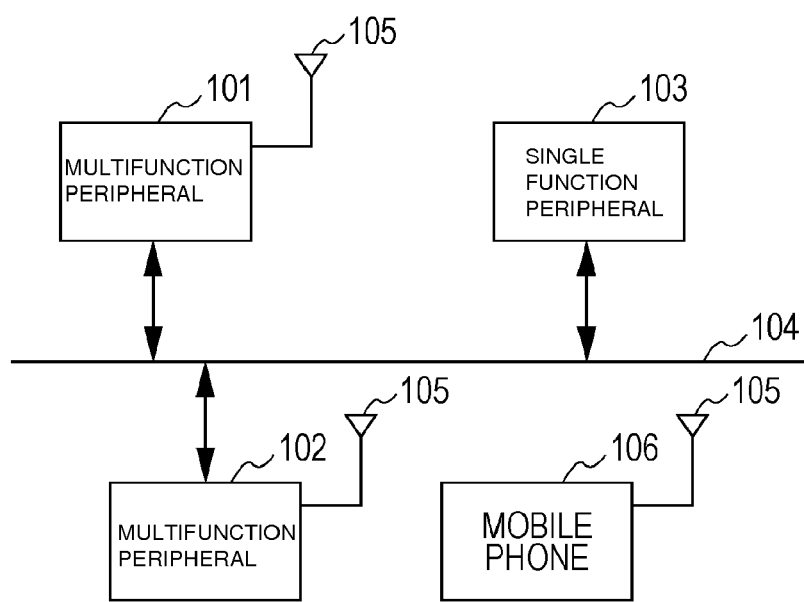
FIG. 1 is a block diagram illustrating a configuration of an image processing system according to an exemplary embodiment of the present invention.

FIG. 1 is a block diagram illustrating a configuration of an image processing system serving as an example of an information processing system according to an exemplary embodiment of the present invention. In this exemplary embodiment, a description will be given using multifunction peripherals (MFPs) as an example of the information processing apparatus.

Referring to FIG. 1, an image processing system includes an MFP 101, an MFP 102, and a single function peripheral (SFP) 103, which are connected to each other via a network 104. The MFP 101 is also connected to a mobile phone 106 via a wireless communication line 105, such as a telephone line.

The MFP 101 is a multifunction device having a printer function, a copier function, and a facsimile function. The MFP 101 also has a password authentication function. Additionally, the MFP 101 has a biometric authentication function for authenticating users using biometric information, such as face information.

Like the MFP 101, the MFP 102 is a multifunction device having a printer function, a copier function, and a facsimile function. The MFP 102 has a password authentication function but does not have a biometric authentication function for authenticating users using biometric information, such as face information.

The SFP 103 has a printer function but does not have a password authentication function and a biometric authentication function.

The mobile phone 106 is an example of a mobile terminal. The mobile phone 106 wirelessly communicates with the MFPs 101 and 102.

A configuration of engines included in the MFPs 101 and 102 and the SFP 103 according to this exemplary embodiment may be electronic photography or inkjet. In addition, the network 104 may be wired or wireless.

Figure 2:
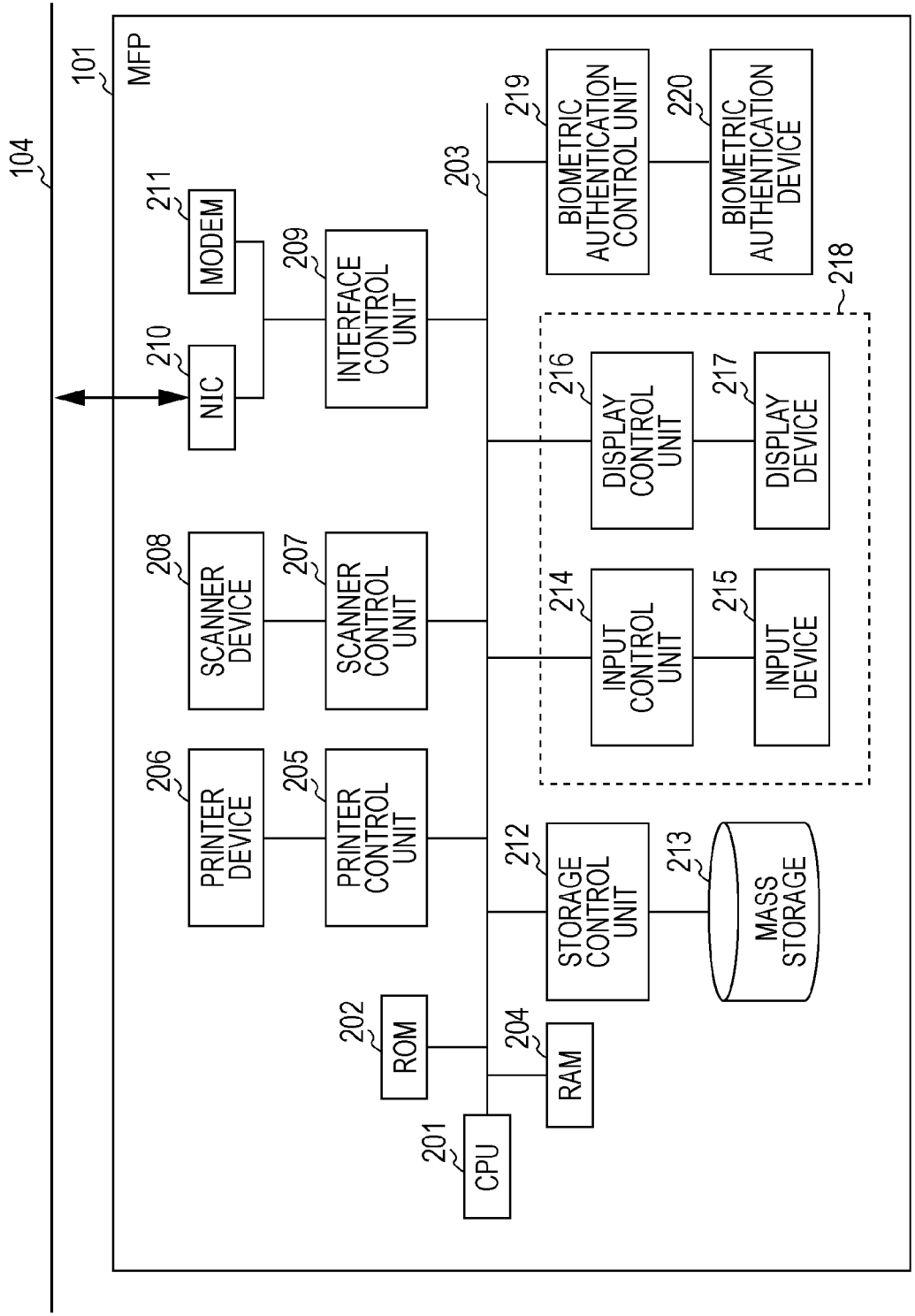
FIG. 2 is a block diagram showing a configuration of a multifunction peripheral (MFP) shown in FIG. 1.

FIG. 2 is a block diagram showing a configuration of the MFP 101 shown in FIG. 1.

Referring to FIG. 2, a central processing unit (CPU) 201 controls the MFP 101. For example, the CPU 201 activates an operating system (OS) in accordance with a boot program stored in a read-only memory (ROM) 202. The CPU 201 also executes a control program and various application programs stored in a mass storage 213 using the OS. In addition, for example, the CPU 201 controls storage of data in a random access memory (RAM) 204 and the mass storage 213. The CPU 201 is connected to each unit through an internal bus, such as a data bus 203.

The RAM 204 functions as a main memory and a temporary storage area, such as a work area, of the CPU 201. The RAM 204 is also used as an image processing temporary storage area. A printer control unit 205 controls a printer device 206 to print an image corresponding to image data on a sheet.

A scanner control unit 207 controls a scanner device 208 to acquire image data. The scanner device 208 converts image information on a paper document into electric signal data with an optical scanning device, such as a charge coupled device (CCD).

An interface control unit 209 controls a network interface (I/F), such as a network interface card (NIC) 210, to send and receive data, such as image data, via the network 104.

The interface control unit 209 also controls a modem 211 to send and receive data via a telephone line.

A storage control unit 212 controls the mass storage 213. The mass storage 213 is a memory, such as a hard disk drive (HDD), which data is read out from and written in. The mass storage 213 stores a control program for controlling the system, various application programs, and various kinds of data, such as scanned image data.

The mass storage 213 can be accessed from the MFP 102 and the SFP 103, which are examples of other information processing apparatus, to allow the MFP 102 and the SFP 103 to use image data stored in the mass storage 213. When a storage area or image data requiring authentication among image data stored in the mass storage 213 is accessed, the CPU 201 requests a user to input authentication information using, for example, an operation section 218. The CPU 201 then performs user authentication based on the input authentication information. In response to success of the user authentication, the CPU 201 permits the requested access. Here, the term "access" includes access from the operation section 218 of the MFP 101 and access from other information processing apparatuses via the network 104.

The operation section 218 includes an input control unit 214, an input device 215, a display control unit 216, and a display device 217.

The input control unit 214 receives user operations input from the input device 215, such as a touch panel and hardware keys. The display control unit 216 controls the display device 217, such as a liquid crystal display, to display operation screens.

A biometric authentication control unit 219 compares user's biometric information input through a biometric authentication device (biometric authentication apparatus) 220 with user's biometric information previously registered in the mass storage 213 to perform user authentication. Although the description is given for an example of using user's face information as the user's biometric information in this exemplary embodiment, the biometric information is not limited to the face information and may be user's voice print information.

The biometric authentication device 220 is a biometric information detection sensor, such as a camera for capturing an image of a user's face and converting the image into face information and a microphone for capturing user's voice and converting the user's voice into voice print information. The biometric authentication device 220 is used as an authentication information input unit for inputting authentication information, such as biometric information.

Figure 3:
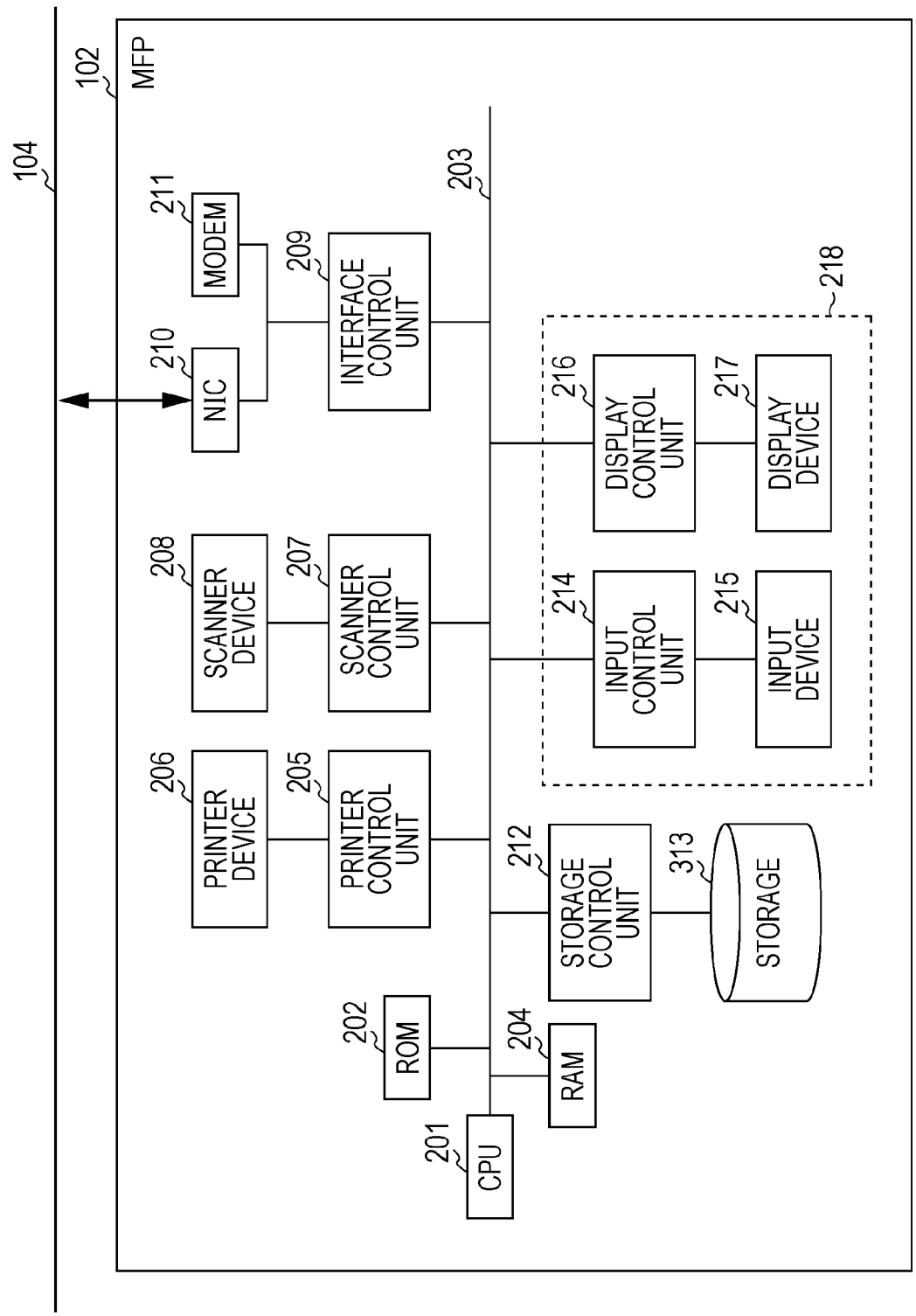
FIG. 3 is a block diagram showing a configuration of an MFP shown in FIG. 1.

FIG. 3 is a block diagram showing a configuration of the MFP 102 shown in FIG. 1. Similar or like references designate units commonly shown in FIG. 2.

The MFP 102 has a basic configuration similar to the MFP 101 shown in FIG. 2. The MFP 102 differs from the MFP 101 in that the MFP 102 includes a storage 313 instead of the mass storage 213 included in the MFP 101.

Additionally, the MFP 102 does not include the biometric authentication control unit 219 and the biometric authentication device 220 included in the MFP 101, and thus does not have a biometric authentication function.

Figure 4:
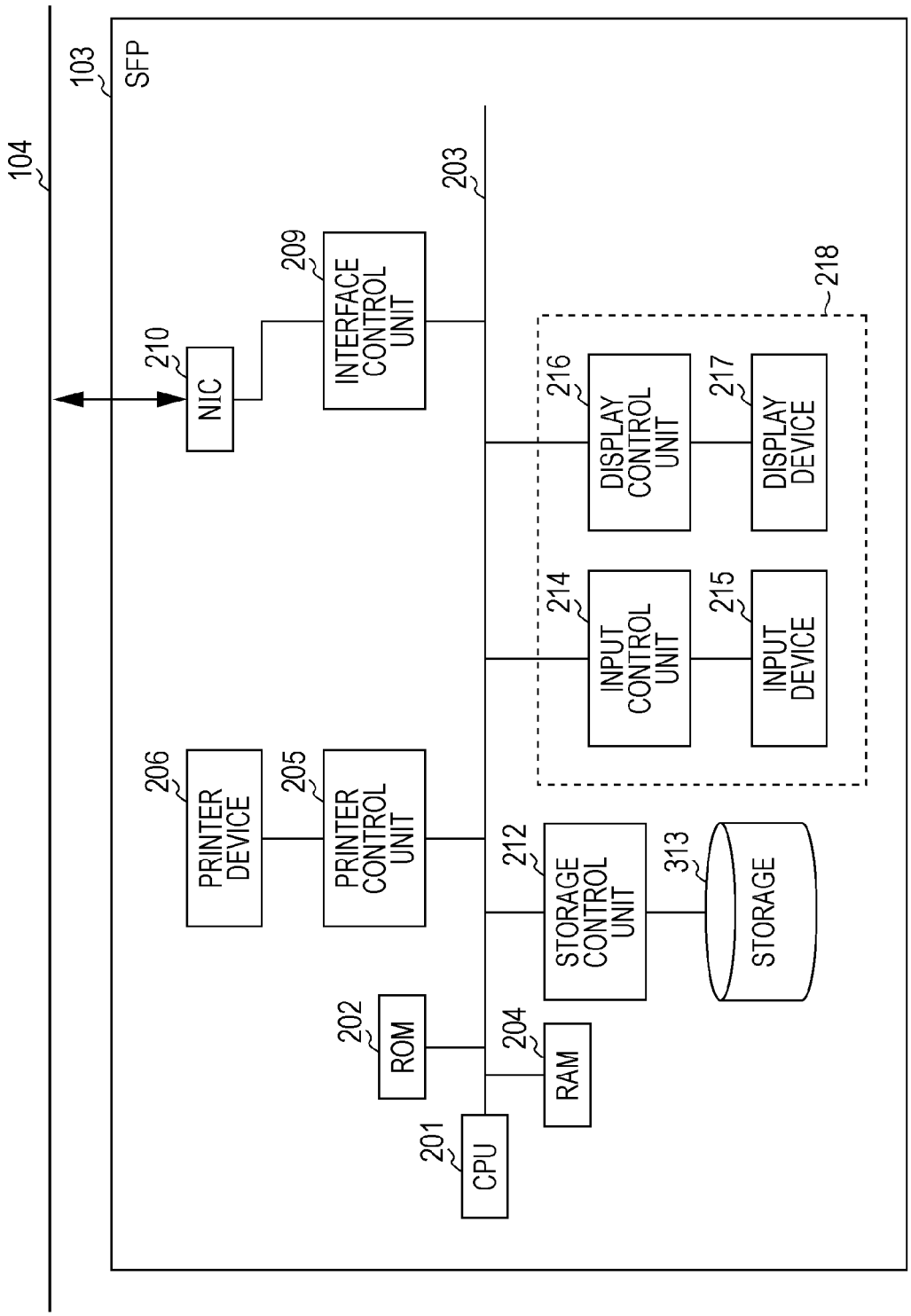
FIG. 4 is a block diagram showing a configuration of a single function peripheral (SFP) shown in FIG. 1.

FIG. 4 is a block diagram showing a configuration of the SFP 103 shown in FIG. 1. Similar or like references designate units commonly included in the MFP 102 shown in FIG. 3.

Since the SFP 103 does not have the above-described scanner function, the SFP 103 differs from the MFP 102 shown in FIG. 3 in that the SFP 103 does not include the scanner control unit 207 and the scanner device 208. Furthermore, since the SFP 103 does not have the facsimile function, the SFP 103 does not include the modem 211.

Figure 5:
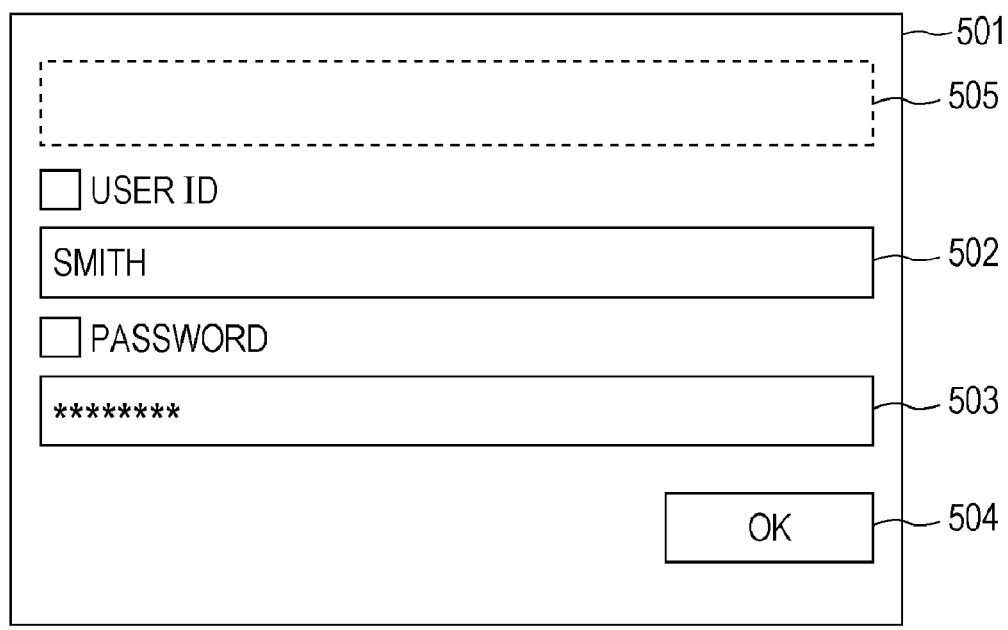
FIG. 5 is a diagram showing an example of a user interface to be displayed on a display device included in MFPs and an SFP shown in FIG. 1.
Figure 6:
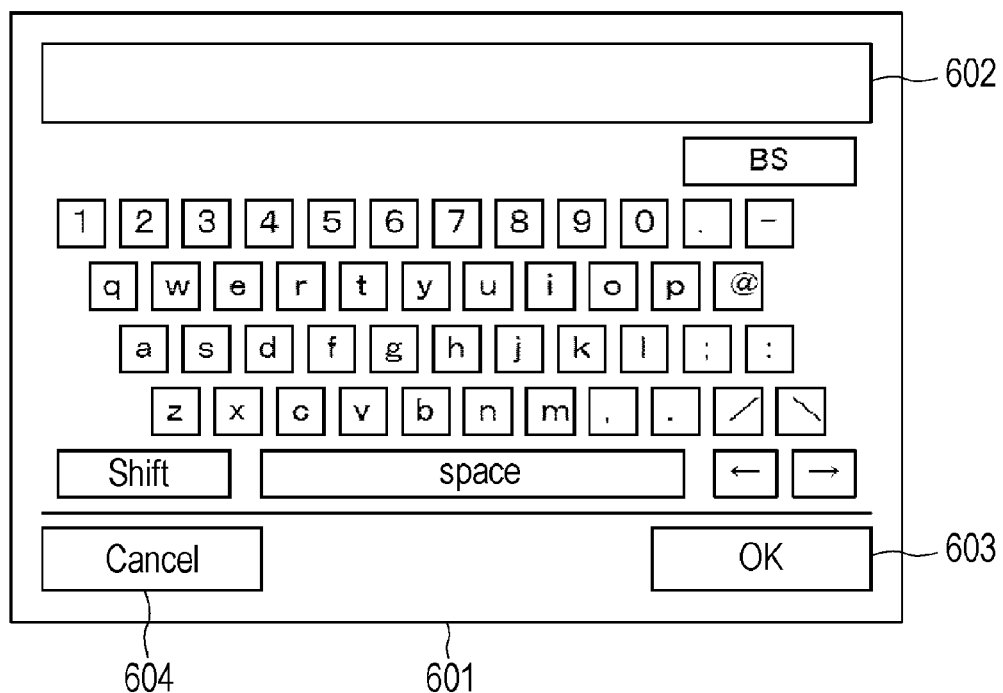
FIG. 6 is a diagram showing an example of a user interface to be displayed on a display device included in MFPs and an SFP shown in FIG. 1.

FIGS. 5 and 6 are diagrams showing examples of user interfaces to be displayed on the display device 217 included in the MFPs 101 and 102 and the SFP 103 shown in FIG. 1.

Referring to FIG. 5, a screen 501 is for accepting input of a user ID and a password for use in user authentication from a user.

A user ID input field 502 is an area for accepting input of a user ID. After the area is selected, the display control unit 216 displays a software keyboard 601 shown in FIG. 6 on the display device 217 in accordance with an instruction of the CPU 201.

The user operates keys of the software keyboard 601 to input the user ID. The input content is displayed at an input character string display label 602. If the user presses an OK button 603, the software keyboard 601 is closed and the input content is reflected at the user ID input field 502. A cancel button 604 is pressed to hide the software keyboard 601.

A password input field 503 shown in FIG. 5 is an area for accepting input of a password corresponding to the user ID input at the user ID input field 502. After the area is selected, the display control unit 216 displays the software keyboard 601 on the display device 217 in accordance with an instruction of the CPU 201. The user can input the password through the software keyboard 601. However, the same number of "*" as the number of input characters is displayed at the password input field 503 and the input character string display label 602 of the software keyboard 601 that is displayed in response to selection of the password input field 503 to mask the input content.

An OK button 504 is for setting the input contents of the user ID input field 502 and the password input field 503. In response to pressing of the OK button 504, the CPU 201 acquires biometric information from the biometric authentication control unit 219 through the biometric authentication device 220 to perform authentication processing. If the user authentication of the biometric authentication control unit 219 succeeds, the CPU 201 controls the display device 217 to switch the currently displayed screen to an operation screen to allow the user to use the functions of the MFP 101.

If the user authentication fails, the CPU 201 displays an error message, such as "authentication failed" at a message label 505.

Figure 7:
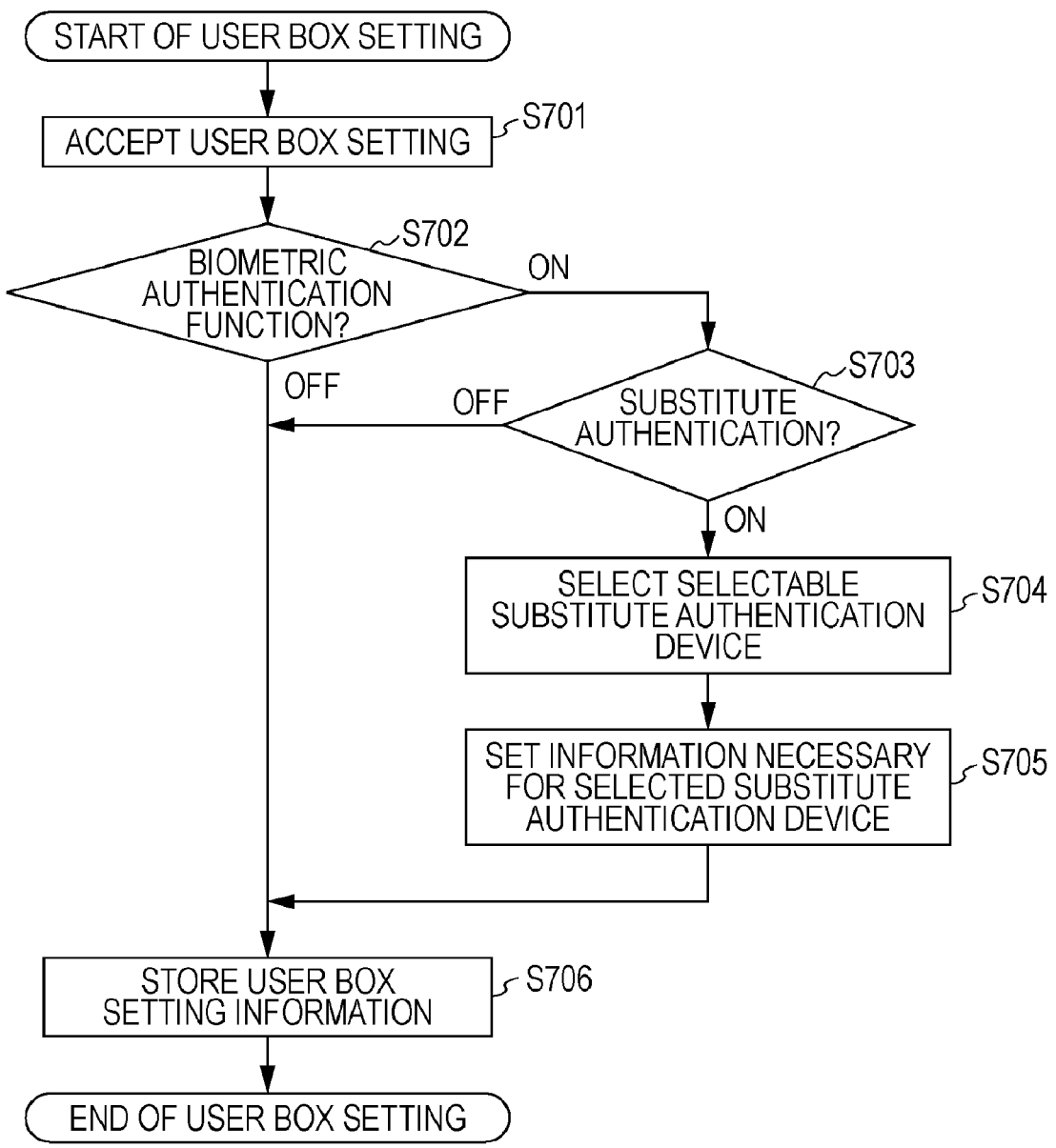
FIG. 7 is a flowchart showing an example of a data processing procedure executed by an MFP according to an exemplary embodiment of the present invention.

FIG. 7 is a flowchart showing an example of a data processing procedure executed by an image processing apparatus according to this exemplary embodiment. This example shows a procedure executed by the CPU 201 of the MFP 101 when setting of a user box of the mass storage 213 is made in the MFP 101 shown in FIG. 1. The user box indicates each of a plurality of storage areas resulting from division of a storage area of the mass storage 213. Each storage area can stores image data and files. In addition, a user can make different authentication settings for each of the user boxes. The CPU 201 performs user authentication in accordance with the authentication method set for the user box. The CPU 201 loads a control program from the ROM 202 or the mass storage 213 to the RAM 204 and executes the control program, thereby realizing each of steps S701-S706.

At S701, the CPU 201 accepts a user box setting from a user. More specifically, in response to pressing of a user mode key, not shown, the CPU 201 controls the display control unit 216 to display a user box setting screen 801 shown in FIG. 8 on the display device 217. After the user specifies one of user boxes 01-05, the CPU 201 displays a screen 901 shown in FIG. 9 on the display device 217. The CPU 201 then accepts various settings regarding the user box through the screen shown in FIG. 9.

Figures 8, 9:
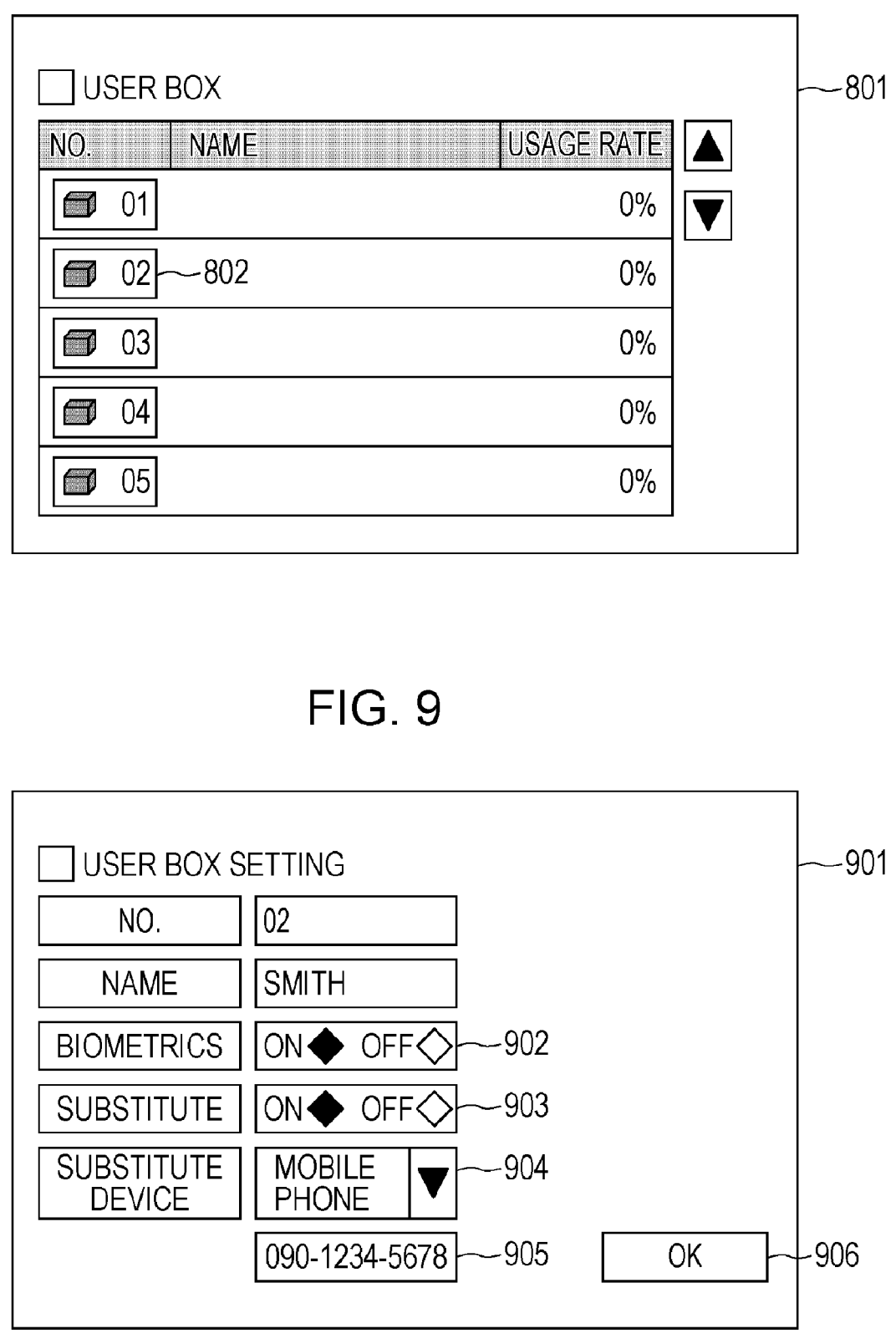

The screen 901 shown in FIG. 9 includes a box number, a name, and a setting regarding a biometric authentication function of the user box specified by the user in the screen 801 shown in FIG. 8. The CPU 201 accepts a change of the name of the user box, a setting regarding ON/OFF of the biometric authentication function, a setting regarding ON/OFF of a substitute authentication function, and a setting regarding a substitute apparatus on the screen shown in FIG. 9 from the user. After completing the settings through the screen shown in FIG. 9, the user presses an OK button 906. If the CPU 201 determines that the user has pressed the OK button 906, the process proceeds to S702.

At S702, the CPU 201 determines whether the biometric authentication function is enabled based on a button 902. If the CPU 201 determines that the button 902 is set ON, the process proceeds to S703. If the CPU 201 determines that the button 902 is set OFF, the process proceeds to S706. At S703, whether to permit access from a substitute apparatus is determined based on a button 903.

If the CPU 201 determines that the button 903 is set ON, the process proceeds to S704. If the CPU 201 determines that the button 903 is set OFF at S703, the process proceeds to S706.

At S704, the CPU 201 sets a substitute apparatus selected by a pull-down menu 904 in association with the specified user box. The process then proceeds to S705.

At S705, the CPU 201 sets connection information for accessing the substitute apparatus input at a field 905 in association with the specified user box. This connection information is used by the MFP 101 to access the substitute apparatus that is permitted to be used. In this exemplary embodiment, since the mobile phone 106 is set as the substitute apparatus by the pull-down menu 904, a phone number is set as the connection information in the screen shown in FIG. 9. The process then proceeds to S706.

At S706, the CPU 201 stores the content of the user box setting in the mass storage 213 and terminates the process.

In this manner, the user can set, for each user box of the mass storage 213, ON/OFF of biometric authentication, ON/OFF of substitute authentication, and a substitute apparatus. The description is given for an example case where the MFP 101 according to this exemplary embodiment uses a camera as the biometric authentication device 220 and performs face authentication with the biometric authentication control unit 219 using user's face information captured by the camera. Accordingly, when the biometric authentication is set ON for the user box by the button 903 in this exemplary embodiment, the CPU 201 requests the user to input face information for use in the face authentication when the user requests to access the user box.

FIGS. 10A and 10B are flowcharts showing an example of a first data processing procedure executed by the information processing system according to this exemplary embodiment. This example shows a case where the MFP 102 accesses a user box of the MFP 101. The CPU 201 of the MFP 102 executes a program stored in the ROM 202 of the MFP 102, thereby executing S1001, S1003, S1004, S1009, S1014-S1017, S1026, and S1027. Additionally, the CPU 201 of the MFP 101 executes S1002, S1005-S1008, S1010-S1013, S1018-S1020, and S1023-S1025. Furthermore, a CPU, not shown, included in the mobile phone 106 executes a program stored in a ROM of the mobile phone 106, thereby executing S1021 and S1022.

At S1001, the MFP 102 sends a login request to the MFP 101 in accordance with a user operation. Upon receiving the user login request, the MFP 101 requests the MFP 102 to send a user ID and a password at S1002.

Upon receiving the request, the MFP 101 displays the screen 501 on the display device 217 to prompt a user to input the user ID and the password through the operation section 218.

At S1003, the MFP 102 accepts input of the user ID and the password through the software keyboard 601 displayed on the operation section 218.

At S1004, the MFP 102 sends the user ID and the password that are accepted through the operation section 218 to the MFP 101.

Upon receiving the user ID and the password at S1005, the MFP 101 performs user authentication based on the received user ID and password.

At S1006, the MFP 101 determines whether the user authentication has succeeded. If the MFP 101 determines that the user authentication has failed, the process proceeds to S1007. At S1007, the MFP 101 notifies the MFP 102 of failure of the authentication.

Upon receiving the authentication failure notification from the MFP 101 at S1026, the MFP 102 displays an error message, such as "authentication failed", at the message label 505 shown in FIG. 5.

If the CPU 201 of the MFP 101 determines that the user authentication has succeeded at S1006, the process proceeds to S1008. At S1008, the MFP 101 sends display screen information for allowing an operation of the user box to the MFP 102.

Upon receiving the display screen information for allowing the operation of the user box of the MFP 101 from the MFP 101, the MFP 102 displays the display screen 801 shown in FIG. 8 on the display device 217 based on the display screen information at S1009. The MFP 102 accepts specification of a user box from the user through the display screen 801.

At S1010, the MFP 101 determines whether the user has specified a user box. If the MFP 101 determines that the user box has been specified, the process proceeds to S1011.

At S1011, the MFP 101 determines whether the specified user box is attached with a setting for performing biometric authentication using user's biometric information to access the specified user box. The MFP 101 determines that the biometric authentication is set if the button 902 is set ON for the specified user box in the screen shown in FIG. 9. If the button 902 is set OFF, the MFP 101 determines that the biometric authentication is not set.

If the biometric authentication is not set, i.e., if the user box is not protected, the MFP 101 permits access to the specified user box. At S1012, the MFP 101 then sends screen information for displaying a list of image data stored in the user box to the MFP 102. The MFP 102 that is permitted to access the specified user box and has received the screen information for displaying the list of the image data displays a user box operation screen shown in FIG. 11 in accordance with the received screen information at S1027.

Figure 11:
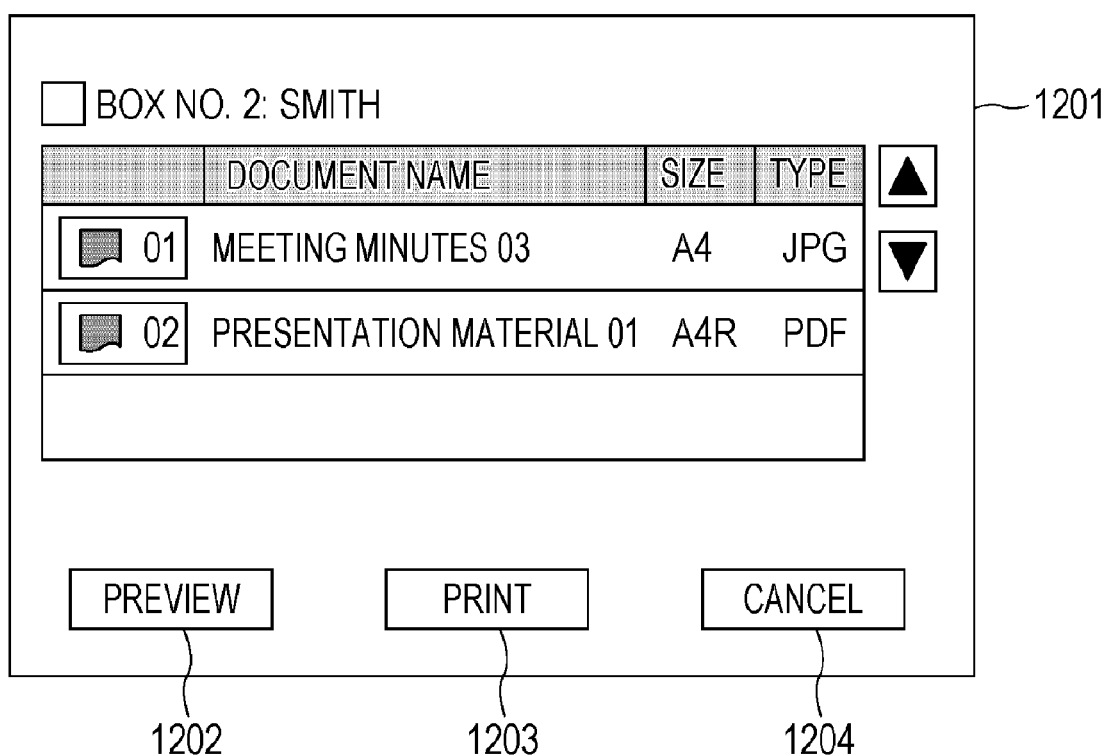
FIG. 11 is a diagram showing an example of a user interface to be displayed in an MFP according to an exemplary embodiment of the present invention.

FIG. 11 shows a screen for accepting instructions, such as print and preview instructions, for image data stored in the user box from a user.

If the user is permitted to use image data stored in the user box, the user can perform following operations.

For example, the user selects image data displayed in a screen 1201 and presses a preview button 1202, thereby being able to preview the selected image data on the display device 217.

Additionally, for example, the user selects image data displayed in the screen 1201 and presses a print button 1203, thereby being able to print the selected image data. Furthermore, the user presses a cancel button 1204, thereby being able to quit accessing the user box.

If the MFP 101 determines the access to the specified user box requires the biometric authentication using user's biometric information at S1011, the process proceeds to S1013.

At S1013, the MFP 101 requests the MFP 102 to send user's biometric information. At S1014, the MFP 102 determines whether the MFP 102 includes an input device for accepting the requested biometric information. The biometric information input device may be, for example, a camera if face information is used as the biometric information or a microphone if voice print information is used as the biometric information.

If the MFP 102 determines that the MFP 102 has the input device for accepting the requested biometric information at S1014, the process proceeds to S1015.

At S1015, the MFP 102 prompts the user to input the biometric information through the display device 217 and accepts input of the biometric information from the user. At S1016, the MFP 102 sends the acquired biometric information to the MFP 101.

If the MFP 102 determines that the MFP 102 does not have the input device for accepting the requested biometric information at S1014, the process proceeds to S1017. At S1017, the MFP 102 notifies the MFP 101 that the MFP 102 does not have the biometric information input device.

At STEP S1018, the MFP 101 determines whether the biometric information has been received from the MFP 102. If the MFP 101 determines that the biometric information has been received, the MFP 101 compares the received biometric information with pre-registered user's biometric information to perform biometric authentication. Here, the MFP 101 compares the received biometric information with biometric information corresponding to the user ID received at S1005 of the pre-registered user's biometric information. The process then proceeds to S1023.

If the MFP 101 determines that the biometric authentication has succeeded at S1023, the MFP 101 permits access to the specified user box at S1025. The MFP 101 then sends screen information of a list of image data stored in the user box to the MFP 102. The MFP 102 that is permitted to access the specified user box and has received the screen information for displaying the list of the image data displays the user box operation screen shown in FIG. 11 in accordance with the received screen information at S1027.

If the MFP 101 determines that the biometric information has not been received, such as a case where the MFP 101 receives, for example, the notification indicating that the MFP 102 does not have the biometric information input device, at S1018, the process proceeds to S1019. At S1019, the MFP 101 determines whether substitute authentication is permitted to access the specified user box. More specifically, the MFP 101 determines whether the substitute authentication is permitted for the specified user box based on whether the button 903 is set ON.

If the MFP 101 determines that the substitute authentication is not permitted at S1019, the MFP 101 sends information indicating failure of authentication to the MFP 102 at S1024. Upon receiving the information indicating the failure of authentication, the MFP 102 displays information indicating the failure of authentication on the display device 217 at S1026 and terminates the process.

If the MFP 101 determines that the substitute authentication is permitted at S1019, the process proceeds to S1020. At S1020, the MFP 101 identifies a device registered as a substitute apparatus in the screen shown in FIG. 9 and accesses the identified device based on the information input at the field 905. Since the mobile phone 106 is selected as the substitute apparatus in this exemplary embodiment, the MFP 101 accesses a phone number stored as the substitute apparatus information using the modem 211 through the telephone line 105. After establishing a connection to the mobile phone 106, the MFP 101 sends audio data, which is stored in the mass storage 213 and prompts the user to input biometric information, to the mobile phone 106 through the telephone line 105.

In this exemplary embodiment, the description is given for a case where the MFP 101 requests the mobile phone 106 to send face information as the biometric information.

Figure 12:
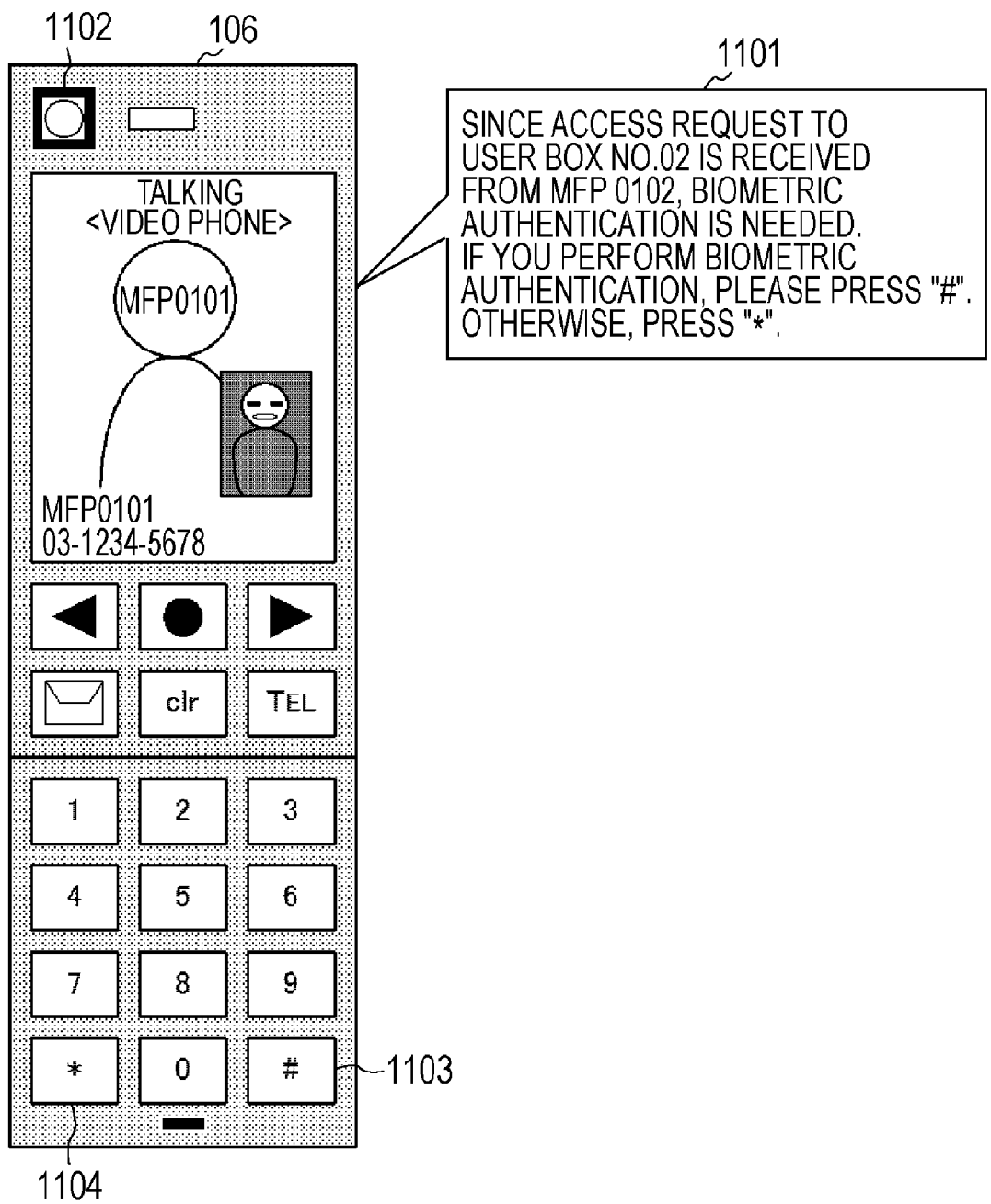
FIG. 12 is a diagram illustrating a user interface to be displayed in a mobile phone shown in FIG. 1.

FIG. 12 is a diagram illustrating a screen to be displayed in the mobile phone 106 shown in FIG. 1.

As shown in FIG. 12, the mobile phone 106 has a camera unit 1102. The camera unit 1102 may be connected to an interface included in the mobile phone 106 from the outside of the mobile phone 106.

As shown by a message 1101, the mobile phone 106 reproduces a message for prompting the user to input face information based on the audio data received from the MFP 101 through the telephone line 105. The user captures an image of their face with the camera unit 1102 in accordance with the reproduced message. The mobile phone 106 generates face information from the captured face image and sends the face information to the MFP 101, for example, by attaching the face information to an email. In this manner, the MFP 101 can acquire user's face information.

The MFP 101 may prompt the user to input the biometric information by sending an email including a message that prompts the user to input biometric information to the mobile phone 106 instead of the audio information. In this case, the user checks the message included in the email received by the mobile phone 106 and captures an image of their face in accordance with the message. The mobile phone 106 then generates face information from the captured face image and stores the face information in a memory of the mobile phone 106. For example, the user replies to the email sent from the MFP 101 after attaching the face information stored in the memory to the email. In this manner, the MFP 101 can acquire user's face information.

The user presses a "#" button 1103 to capture the face image. The user presses an "*" button 1104 to notify the MFP 101 that the user has decided not to capture their face image. In response to pressing of the "*" button 1104, the mobile phone 106 terminates the connection to the MFP 101. The MFP 101 displays a message notifying failure of acquisition of authentication information on the display device 217 of the MFP 101.

In response to pressing of the "#" button 1103, the mobile phone 106 acquires the biometric information by capturing a user's face image with a camera at S1021. At S1022, the mobile phone 106 sends the acquired biometric information to the MFP 101. The button for capturing a face image is not limited to the "#" button and may be other buttons.

The MFP 101 compares the received face information with pre-registered user's face information to perform face authentication. Here, the MFP 101 compares the received face information with face information corresponding to the user ID received at S1005 of the pre-registered user's face information. The process then proceeds to S1023.

If the MFP 101 determines that the face authentication has succeeded at S1023, the MFP 101 permits access to the specified user box at S1025. The MFP 101 sends screen information of a list of image data stored in the user box to the MFP 102. The MFP 102 that is permitted to access the specified user box and has received the screen information for displaying the list of image data displays the user box operation screen shown in FIG. 11 in accordance with the received screen information at S1027.

In this manner, for example, the user selects image data displayed in the screen 1201 and presses the preview button 1202, thereby being able to preview the selected image data on the display device 217.

Additionally, for example, the user selects image data displayed in the screen 1201 and presses the print button 1203, thereby being able to print the selected image data. Furthermore, the user presses the cancel button 1204, thereby being able to quit accessing the user box.

As described above, it is possible to access an information processing apparatus requiring biometric authentication from an information processing apparatus not having a biometric authentication device without decreasing the security level.

Second Exemplary Embodiment

Although a case of performing biometric authentication using user's face information has been described in the first exemplary embodiment, a case of performing biometric authentication using user's voice print information will be described in a second exemplary embodiment. Since a system according to the second exemplary embodiment has a configuration similar to the system according to the first exemplary embodiment, a detailed description thereof is omitted.

In this exemplary embodiment, a data processing procedure executed by the MFPs 101 and 102 and the mobile phone 106 will be described with reference to FIG. 10. Since steps S1001-S1019 are the same as those of the first exemplary embodiment, steps after S1020 will be described in this exemplary embodiment.

If the MFP 101 determines that substitute authentication is permitted at S1019, the process proceeds to S1020. At S1020, the MFP 101 identifies a device that is registered as a substitute apparatus in the screen shown in FIG. 9 and accesses the identified device based on the information input at the field 905. Since the mobile phone 106 is selected as the substitute apparatus in this exemplary embodiment, the MFP 101 accesses a phone number stored as substitute apparatus information using the modem 211 through the telephone line 105. After establishing a connection to the mobile phone 106, the MFP 101 sends audio data, which is stored in the mass storage 213 of the MFP 101 and prompts a user to input biometric information, to the mobile phone 106 through the telephone line 105.

The description is given for a case where the MFP 101 requests the mobile phone 106 to send voice print information as the biometric information in this exemplary embodiment.

Figure 13:
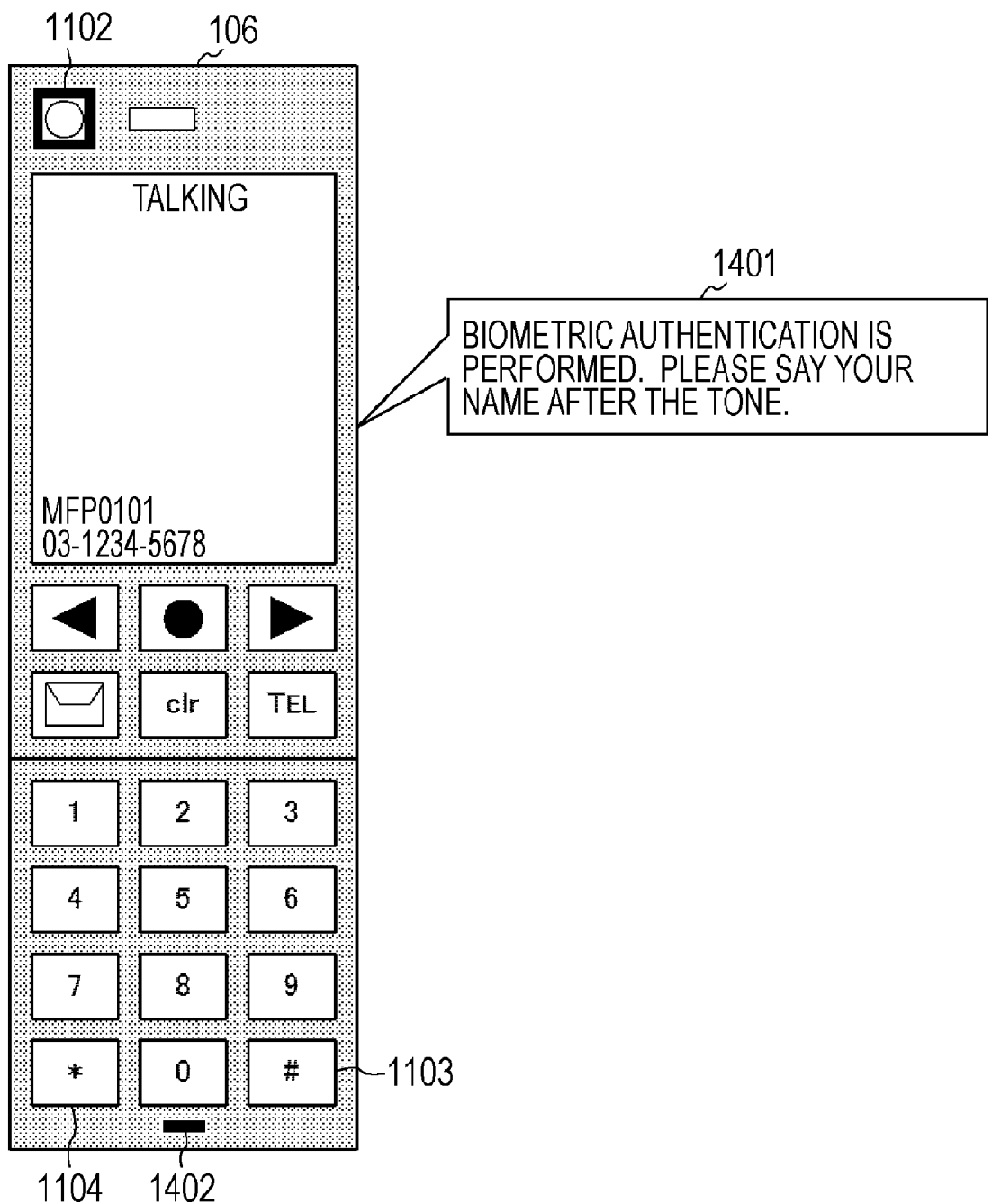
FIG. 13 is a diagram illustrating a user interface to be displayed in a mobile phone shown in FIG. 1.

FIG. 13 is a diagram illustrating a screen to be displayed in the mobile phone 106 shown in FIG. 1.

As shown in FIG. 13, the mobile phone 106 has an audio input unit 1402, which includes a microphone and an audio data recorder.

As shown by a message 1401, the mobile phone 106 reproduces a message for prompting the user to input user's voice print information based on the audio data received from the MFP 101 through the telephone line 105. The user inputs their voice through the microphone in accordance with the reproduced message. The mobile phone 106 then sends the input voice information to the MFP 101 through the telephone line 105. In this manner, the MFP 101 can acquire user's voice print information. Processing for converting voice information into voice print information may be executed by the mobile phone 106 or the MFP 101.

The user presses a "#" button 1103 to record their voice. More specifically, the "#" button 1103 is used as a button for recoding user's voice with a microphone. The user presses an "*" button 1104 to notify the MFP 101 that the user has decided not to input their voice information. In response to pressing of the "*" button 1104, the mobile phone 106 terminates connection to the MFP 101. The MFP 101 displays a message informing failure of acquisition of voice information on the display device 217 of the MFP 101.

In response to pressing of the "#" button 1103, the mobile phone 106 acquires voice print information by recording user's voice with the microphone and the audio data recorder, and stores the voice print information in a memory at S1021. At S1022, the mobile phone 106 sends the voice print information stored in the memory to the MFP 101.

The MFP 101 compares the received voice print information with pre-registered user's voice print information to perform voice print authentication. Here, the MFP 101 compares the received voice print information with voice print information corresponding to the user ID received at S1005 of the pre-registered user's voice print information. The process then proceeds to S1023.

If the MFP 101 determines that the voice print authentication has succeeded at S1023, the MFP 101 permits access to the specified user box. The MFP 101 then sends screen information of a list of image data stored in the user box to the MFP 102 at S1025. The MFP 102 that is permitted to access the specified user box and has received the screen information for displaying the list of the image data displays the user box operation screen shown in FIG. 11 in accordance with the received screen information at S1027.

In this manner, for example, the user selects image data displayed in the screen 1201 and presses the preview button 1202, thereby being able to preview the selected image data on the display device 217.

Additionally, for example, the user selects image data displayed in the screen 1201 and presses the print button 1203, thereby being able to print the selected image data. Furthermore, the user presses the cancel button 1204, thereby being able to quit accessing the user box.

By performing the control operation in the above-described manner, it is possible to access an information processing apparatus requiring voice print authentication from an information processing apparatus not having a voice print authentication function, such as a microphone and an audio data recorder, without decreasing the security level.

Other Exemplary Embodiments

In the above-described exemplary embodiments, when the mobile phone 106 sends biometric information acquired from a user to the MFP 101 using an email, the mobile phone 106 may sends the email after attaching date information generated by the mobile phone 106 to the biometric information to be sent. If the biometric information sent from the mobile phone 106 is attached with the date information, the MFP 101 performs authentication using the biometric information. If the date information is not attached, the MFP 101 does not perform authentication using the biometric information. By controlling the authentication in this manner, the following advantage is provided. For example, a user not having an access right sends face information generated by scanning a photo of a face of a user having the access right with a scanner to the mobile phone 106, stores the face information in the mobile phone 106, and sends the stored face information to the MFP 101 to perform authentication. In such a case, since the face information sent from the mobile phone 106 is not attached with the date information, it is possible to prohibit access from the user not having the access right.

Additionally, even if the date information is attached, the MFP 101 determines whether the date information indicates a predetermined period (e.g., within one day or three days). If the date information does not indicate the predetermined period, the MFP 101 may be controlled not to perform authentication. If the date information indicates the predetermined period, the MFP 101 performs user authentication. In this manner, authentication can be performed on condition that the mobile phone 106 sends new biometric information instead of old one stored in a memory of the mobile phone 106 in response to a request sent to the mobile phone 106 from the MFP 101, for example. The MFP 101 may obviously perform user authentication based on the biometric information regardless of the date information when the MFP 101 receives the biometric information from the mobile phone 106.

In the above-described embodiments, the description has been given for a case where the MFP 102 determines whether the MFP 102 has an input device for accepting biometric information requested by the MFP 101 at S1014. However, this determination may be controlled in the following manner. The MFP 101 may manage information on biometric information input devices of other apparatuses in the mass storage 213 and may perform the determination of S1014 based on the managed information. In this case, the MFP 101 determines whether the MFP 102, which is another apparatus, has an input device for accepting the requested biometric information. If the MFP 101 determines that the MFP 102 has the input device, the MFP 101 requests the MFP 102 to send the biometric information. If the MFP 102, which is the other device, does not have the input device for accepting the requested biometric information, the MFP 101 requests the mobile phone 106 associated with the specified user box to send the biometric information. The mobile phone 106 having received the biometric information input request sends the requested biometric information to the MFP 101. In this manner, the MFP 101 can acquire user's biometric information.

If the MFP 102 determines that the MFP 102 does not have the input device for accepting the biometric information requested by the MFP 101 at S1014, the MFP 102 may directly request the mobile phone 106 to accept input of the biometric information without through the MFP 101. In such a case, when the MFP 102 is requested to send the biometric information by the MFP 101, which is another apparatus, the MFP 102 requests a substitute apparatus to accept input of the biometric information in accordance with pre-registered information indicating a substitute apparatus corresponding to each type of the biometric information. For example, when the type of the biometric information requested by the MFP 101 is face information, the MFP 102 requests the mobile phone 106, which is registered to accept the biometric information, to accept input of the biometric information. Upon receiving the biometric information input request, the mobile phone 106 acquires the biometric information through a user operation and returns the acquired biometric information to the MFP 102. In this manner, the MFP 102 can acquire user's biometric information. In addition, when the MFP 102 requests the mobile phone 106 to send the biometric information, the MFP 102 may send the request attached with an address of the MFP 101. The mobile phone 106 may send the biometric information to the MFP 101 without through the MFP 102. In such a case, a processing load of the MFP 102 for transferring the biometric information sent from the mobile phone 106 to the MFP 101 can be reduced.

Although the description has been given for a case where a user registers one substitute apparatus in association with one user box in the above-described embodiments, the user may register a plurality of substitute apparatuses in association with one user box.

In such a case, the MFP 101 attempts to establish a connection to a substitute apparatus having the highest priority from the plurality of registered substitute apparatuses in accordance with previously registered priority. When the connection with the substitute apparatus having the highest priority is not established for a long time or when a user selects not to input the biometric information, for example, by pressing the "*" button, the MFP 101 attempts to establish a connection to a substitute apparatus having the next highest priority. If the MFP 101 acquires the biometric information from one of the plurality of registered substitute apparatuses, the MFP 101 may perform biometric authentication based on the biometric information. In this case, the MFP 101 may previously allow the user to specify, for each of the substitute apparatuses, information for identifying whether the substitute apparatus is for acquiring face information or voice print information. In this manner, the MFP 101 can determine whether the biometric information acquired from each of the substitute apparatuses is the face information or the voice print information. Accordingly, the MFP 101 can determine whether the biometric information to be compared is the face information or the voice print information based on the type of the substitute apparatus from which the biometric information is acquired.

Although the description has been given for an example of requesting for biometric authentication at the time of accessing a user box in the above-described exemplary embodiments, the timing of requesting for the biometric authentication is not limited to this particular example. For example, the MFP 101 may request the MFP 102 to send biometric information after the MFP 101 receives a login request from the MFP 102. The MFPs 101 and 102 may then perform processing starting from S1014. If the biometric authentication has succeeded, the MFP 102 is permitted to log in the MFP 101. When such a control operation is performed, the MFP 101 stores a substitute apparatus that the MFP 101 requests to send the biometric information in a memory in response to reception of the login request directed to the MFP 101. Upon receiving the login request from the MFP 102, which is another apparatus, the MFP 101 requests the substitute apparatus stored in the memory to send the biometric information.

A control operation similar to the above-described one may be performed in response to an instruction for utilizing image data stored in the user box, such as printing or preview of the image data. When such a control operation is performed, the MFP 101 stores, for each of the image data stored in the user box, a substitute apparatus serving as another apparatus. If the MFP 102 serving as the other apparatus accesses image data, the MFP 101 requests the stored substitute apparatus to send the biometric information. In this manner, the MFP 101 stores apparatus information indicating a substitute apparatus in association with information on an access destination to which the other apparatus requests to access in the mass storage 213. The MFP 101 then requests the substitute apparatus indicated by the apparatus information corresponding to the access requested destination to send the biometric information.

In addition, although the description has been given for a case of using face information or voice print information as the biometric information in the above-described exemplary embodiments, the biometric information is not limited to these kinds of information. For example, user's finger print information, vein information, voice print information, palm shape information, retina information, iris information, or combinations thereof may be used. A device having a biometric information detection sensor corresponding to respective information may be used as a substitute apparatus to acquire the information. For example, in the case of finger print information, a mobile phone having a finger print scanning sensor may be used as the substitute apparatus.

A configuration of data processing programs that can be read by an image processing system according to an exemplary embodiment of the present invention will be described below with reference to a memory map shown in FIG. 14.

FIG. 14 is a diagram illustrating a memory map of a storage medium for storing various data processing programs that can be read by an image processing system according to an exemplary embodiment of the present invention.

Although not shown, the storage medium may store information for managing programs stored on the storage medium, such as, for example, version information and creator information, and information depending on a program-reading OS, such as, for example, icons for discriminating the programs.

Furthermore, data involving the various programs is managed in a directory. In addition, a program for installing the various programs in a computer and a program for decompressing compressed programs to be installed may be stored.

The functions of the above-described exemplary embodiments may be achieved by a host computer in accordance with a program installed from the outside. In such a case, the present invention is also applied to a case of supplying a group of information including programs to an output device from a storage medium, such as a CD-ROM, a flash memory, or an FD, or from an external storage medium via a network.

As described above, a computer-readable storage medium storing program codes of software for realizing the functions of the above-described embodiments is supplied to a system or an apparatus. A computer (or a CPU or an MPU) of the system or the apparatus reads out and executes the program codes stored on the storage medium, whereby the functions of the present invention are obviously achieved.

In this case, the program codes read out from the storage medium realize the novel functions of the present invention. Thus, the storage medium storing the program codes constitutes the present invention.

The program may be in any form, such as an object code, a program executed by an interpreter, or script data supplied to an OS, as long as the program has the functions of the program.

Types of a storage medium for use in supplying the program include, for example, a flexible disk, a hard disk, an optical disc such as a CD-ROM, a CD-R, a CD-RW, or a DVD, a magneto-optical disk such as an MO, a magnetic tape, a nonvolatile memory card, and a ROM.

In another program supplying method, a user accesses an Internet web site using a browser of a client computer. The user then downloads a computer program according to an exemplary embodiment of the present invention or a compressed file having an automatic installation function from the web site to a storage medium, such as a hard disk. In such a manner, the program can be supplied. In addition, program codes constituting the program according to the exemplary embodiment of the present invention may be divided into a plurality of files and the plurality of files may be downloaded from different web sites. In this manner, the functions of the above-described exemplary embodiments can be realized. That is, the present invention also includes a WWW server or an ftp server that allows a plurality of users to download program files for realizing the functions of the exemplary embodiments of the present invention in a computer.

The program according to the exemplary embodiment of the present invention may be encrypted and recorded on a storage medium, such as a CD-ROM, and the storage medium may be distributed to users. In this case, users satisfying a predetermined condition may be permitted to download key information for decrypting the encryption from a web site via the Internet. The users execute the encrypted program using the key information and install the program in a computer, whereby the functions of the above-described exemplary embodiments can be realized.

In addition to realization of the functions according to the above-described exemplary embodiments by the computer's execution of the read out program codes, an operating system (OS) running on the computer may execute part of or all of actual processing, for example, on the basis of instructions of the program codes, whereby the functions of the exemplary embodiments may be realized. The present invention obviously includes such a case.

Furthermore, the program codes read out from a storage medium may be written in a memory of a function expansion board inserted into the computer or a function expansion unit connected to the computer. A CPU or the like included in the function expansion board or the function expansion unit may execute part of or all of actual processing on the basis of instructions of the program codes, thereby realizing the functions of the above-described exemplary embodiments. The present invention obviously includes such a case.

It should be understood that the present invention is not limited to the above-described exemplary embodiments and can be variously modified based on the spirit of the present invention (including combinations of the exemplary embodiments). These modifications should not be excluded from the scope of the present invention.

Although the description has been given for various examples and exemplary embodiments of the present invention, the spirit and scope of the present invention should not be limited to the specific description given herein.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. An information processing apparatus comprising:
   an authenticating unit configured to authenticate a user using biometric information;
   a receiving unit configured to receive an access request from an external apparatus;
   a requesting unit configured to request the external apparatus to send the biometric information upon the receiving unit receiving the access request from the external apparatus; and
   a storing unit configured to store apparatus information indicating a predetermined substitute apparatus is associated with information on an access destination of the access request,
   wherein, in a case where the external apparatus does not have an inputting unit for inputting the requested biometric information, the requesting unit requests the predetermined substitute apparatus indicated by the apparatus information stored in the storing unit in association with the access destination of the access request of the requesting unit to send the biometric information, and
   wherein the authenticating unit authenticates the user based on the biometric information sent from the predetermined substitute apparatus in response to the request of the requesting unit.

2. The apparatus according to claim 1, wherein the storing unit stores connection information used by the information processing apparatus to establish a connection to the substitute apparatus.

3. The apparatus according to claim 1, wherein the apparatus information stored in the storing unit can be set by a user.

4. The apparatus according to claim 1, wherein the biometric information is user's face information, finger print information, vein information, voice print information, palm shape information, retina information, or iris information.

5. A control method for controlling an information processing apparatus, the control method comprising:
   authenticating a user using biometric information;
   receiving an access request from an external apparatus;
   requesting the external apparatus to send the biometric information in response to reception of the access request from the external apparatus; and
   controlling apparatus information indicating a predetermined substitute apparatus to be stored in a storing unit in association with information on an access destination of the access request,
   wherein, in a case where the external apparatus does not have an inputting unit for inputting the requested biometric information, the requesting step includes requesting the predetermined substitute apparatus indicated by the apparatus information stored in the storing unit in association with the access destination of the access request made at the requesting step to send the biometric information, and
   wherein the authenticating step includes authenticating the user based on the biometric information sent from the predetermined substitute apparatus in response to the request made at the requesting step.

6. The method according to claim 5, wherein the storing unit stores connection information used by the information processing apparatus to establish a connection to the substitute apparatus.

7. The method according to claim 5, wherein the apparatus information stored in the storing unit can be set by a user.

8. The method according to claim 5, wherein the access is access to the external apparatus, access to a storage device included in the external apparatus, or access to data stored in a storage device included in the external apparatus.

9. The method according to claim 5, wherein the biometric information is user's face information, finger print information, vein information, voice print information, palm shape information, retina information, or iris information.

10. A computer-readable memory medium storing a computer-executable program for controlling an information processing apparatus, the control method comprising:
    authenticating a user using biometric information;
    receiving an access request from an external apparatus;
    requesting the external apparatus to send the biometric information in response to reception of the access request from the external apparatus; and
    controlling apparatus information indicating a predetermined substitute apparatus to be stored in a storing unit in association with information on an access destination of the access request,
    wherein, in a case where the external apparatus does not have an inputting unit for inputting the requested biometric information, the requesting step includes requesting the predetermined substitute apparatus indicated by the apparatus information stored in the storing unit in association with the access destination of the access request made at the requesting step to send the biometric information, and
    wherein the authenticating step includes authenticating the user based on the biometric information sent from the predetermined substitute apparatus in response to the request made at the requesting step.

* * * * *